(12) United States Patent
Cribiu'

(10) Patent No.: US 9,701,480 B2
(45) Date of Patent: Jul. 11, 2017

(54) TENSIONING DEVICE FOR CONVEYOR BELT

(71) Applicant: CRIZAF S.R.L., Saronno (IT)

(72) Inventor: Luca Cribiu', Saronno (IT)

(73) Assignee: CRIZAF S.R.L., Saronno (IT)

( * ) Notice: Subject to any disclaimer, the term of this patent is extended or adjusted under 35 U.S.C. 154(b) by 0 days.

(21) Appl. No.: 15/028,894

(22) PCT Filed: Oct. 14, 2014

(86) PCT No.: PCT/EP2014/072067
§ 371 (c)(1),
(2) Date: Apr. 12, 2016

(87) PCT Pub. No.: WO2015/055687
PCT Pub. Date: Apr. 23, 2015

(65) Prior Publication Data
US 2016/0251165 A1  Sep. 1, 2016

(30) Foreign Application Priority Data

Oct. 15, 2013  (IT) .............................. MI2013A1707

(51) Int. Cl.
*B65G 23/44* (2006.01)
*B65G 21/10* (2006.01)

(52) U.S. Cl.
CPC ............. *B65G 23/44* (2013.01); *B65G 21/10* (2013.01)

(58) Field of Classification Search
CPC ................................ B65G 23/44; B65G 21/10
USPC ....................................................... 198/816
See application file for complete search history.

(56) References Cited

U.S. PATENT DOCUMENTS

| 2,808,924 | A | * | 10/1957 | Wood ..................... | B65G 23/44 198/816 |
| 5,054,680 | A | * | 10/1991 | Stockham ............... | H01L 24/78 228/104 |
| 5,947,264 | A |   | 9/1999  | Eltvedt | |
| 6,209,715 | B1 | * | 4/2001 | Eltvedt ................. | B65G 23/44 198/813 |
| 7,267,223 | B2 | * | 9/2007 | Spoors ................... | B65G 21/02 198/816 |

(Continued)

FOREIGN PATENT DOCUMENTS

| DE | 32 04 700 U1 | 5/1982 |
| DE | 103 43 541 A1 | 5/2005 |

OTHER PUBLICATIONS

International Search Report, dated Jan. 13, 2015, from corresponding PCT Application.

*Primary Examiner* — Mark A Deuble
(74) *Attorney, Agent, or Firm* — Young & Thompson

(57) ABSTRACT

A tensioning device for a conveyor belt (10) used for moving semi-finished or finished products along the lines of production or storage or the like, includes mechanical elements integrated in the structure of a frame (12) of the conveyor belt, provided with a roto-translation movement with manual actuation and co-operating with thrust elements with translation movement for adjusting the tension of a moving mat (16) via a change in the center distance between a reversing roller (20) and a motor roller (18) which subtend the moving mat and are transversely arranged at opposite ends of two opposing and parallel lateral shoulders (14) of the frame (12) of the conveyor belt.

8 Claims, 6 Drawing Sheets

(56) References Cited

U.S. PATENT DOCUMENTS

2002/0074214 A1* 6/2002 Klabisch ............... B65G 19/28
                                                    198/813
2005/0189201 A1* 9/2005 Schlagel ............... B65G 23/44
                                                    198/816

* cited by examiner

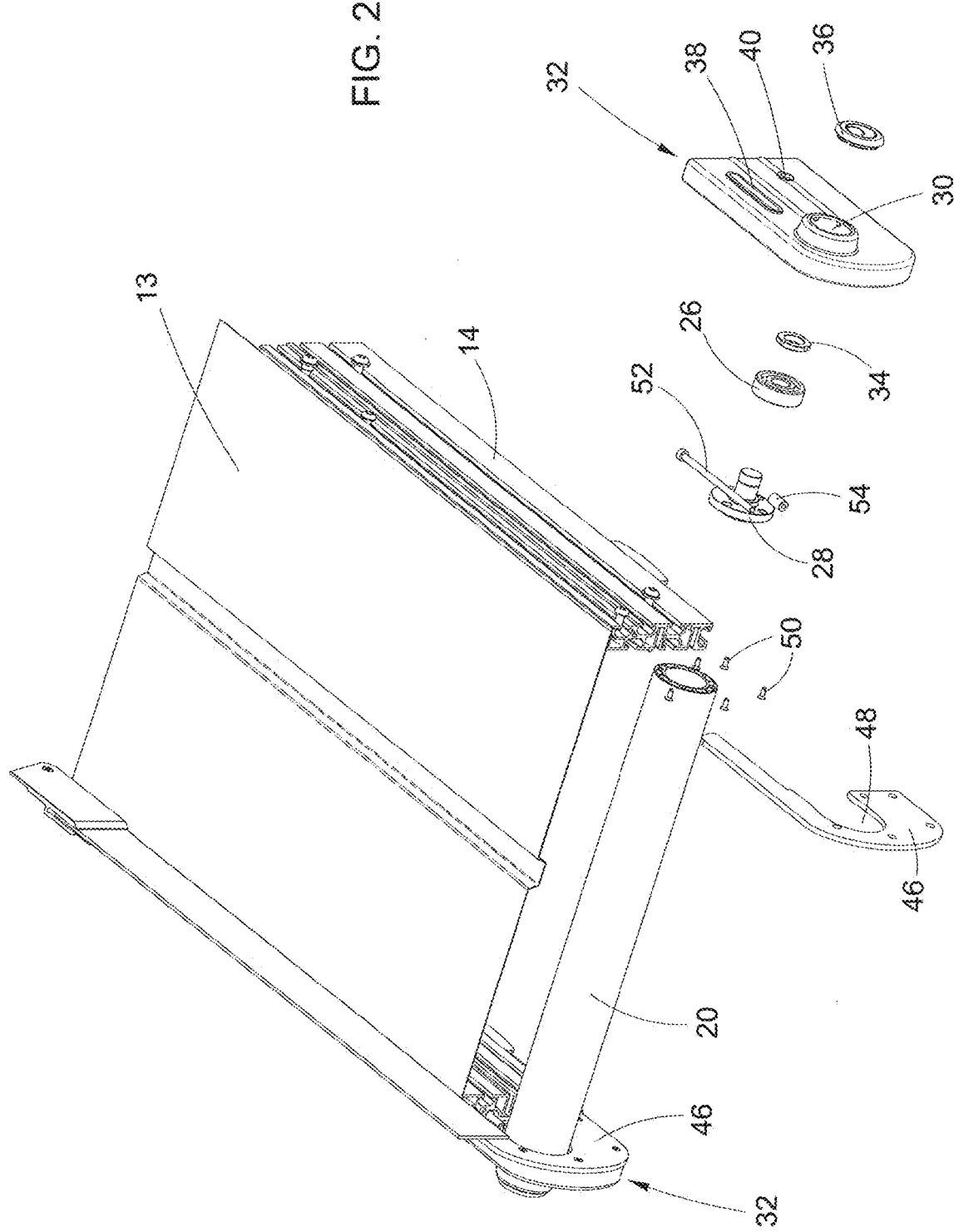

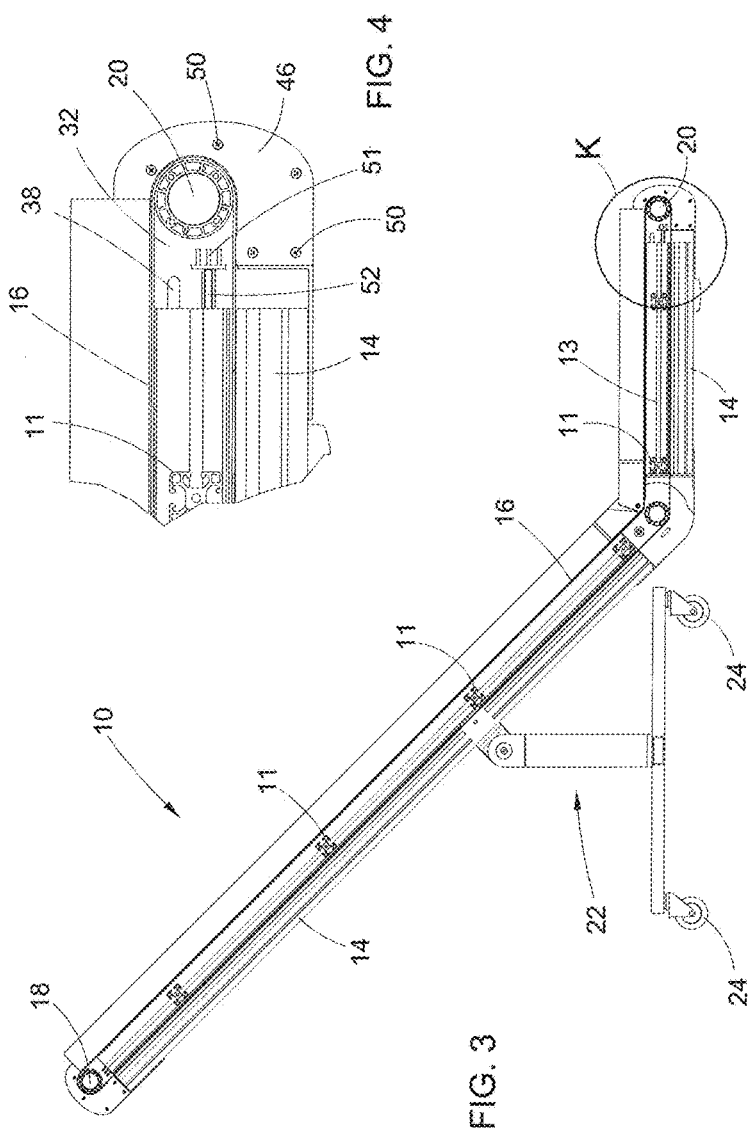

TENSIONING DEVICE FOR CONVEYOR BELT

The object of the present invention is a tensioning device for conveyor belt.

More particularly the present invention relates to a tensioning device especially suitable for being integrated in the structure of the frame of a conveyor belt.

As is known, conveyor belts are mechanical devices having the function of moving, in a continuous manner or by points, semi-finished or finished products (placed loose or ordered) along the production lines, for example for the feeding/loading of the products in a production line or for the transfer from one processing station to the next or, again, for the unloading/storage of the finished products.

Conveyor belts are typically made up of a metal framework or frame structure which comprises the support of the belt (the surface of sliding or the support rollers), a motor roller or drum (typically the head drum) and a reversing roller or drum (typically the tail drum) with neutral rotation and a mat in canvas (impregnated or not) or rubber (canvas-covered or not) or, again, in steel or in another known and suitable material whereon the products or semi-finished goods are placed and transported, in a varyingly ordered manner, during the cycle of production or storage or the like.

Conveyor belts can have, according to the specific needs of movement of the products or of type of products which have to be moved or of layout of the plant inside whereof the conveyor belt is placed, a rectilinear flat development or can follow curved routes or, again, have a sloping development with predefined and fixed slant or adjustable as a function of specific needs.

Moreover conveyor belts are typically provided with tensioning means having the function of guaranteeing a tension of the mobile mat suitable for a correct transport of the material/products also in the presence of possible variations of speed or sliding of the mat with respect to the transport rollers due, for example, to elongations during the start-up phase or to variations of load.

The tension is typically set by going to regulate the centre distance between the motor roller and the reversing roller. In particular this variation in the centre distance is obtained by acting directly on the reversing roller which operates as fixed tensioner which runs parallel to the axis of the mat or to the direction of running of the moving mat.

This solution is particularly suitable in the case wherein it is not necessary to compensate possible variations in length or tension of the mobile mat during the functioning of the belt.

Other known solutions, particularly suitable in the case wherein the centre distance between the motor roller and the reversing roller cannot be varied, use tensioning devices which act on the moving mat at the side of return of the same.

These solutions provide for the use of accessory devices attached to the frame of the conveyor belt with manual or automatic actuation (by means of electric, pneumatic or hydraulic actuators).

Other traditional constructional solutions achieve the tensioning of the belt by means of screws supported by blocks visible outside the structure of the conveyor belt and which act on the assembly of the reversing roller (centre distance variation) by moving it or use supports of the roller provided with threaded bars or, again, use systems with drives and plates comprising screws apt to pull the roller.

A solution of this type is, for example, described in the document DE10343541 wherein the tensioning device of the conveyor belt is coupled to the motor roller and comprises regulation blocks with longitudinal development attached to the shoulders of the frame of support of the conveyor belt by means of locking devices defined by longitudinal connection screws restrained and adjustable with respect to the shoulders of the frame by means of transverse retaining means of said shoulders of the frame, end elements fitted on said regulation blocks, suitable for supporting the rotation of the motor roller and the motor reducer whereto said motor roller is connected, restrained to said regulation blocks and co-operating with a thrust element inserted in the regulation blocks and which co-operate with a thrust screw with longitudinal movement inserted in the regulation blocks.

These accessory tensioning devices, however, have some important disadvantages linked to the fact that they tend to be somewhat bulky and tendentially characterised by a high degree of constructional complexity.

Moreover these traditional tensioning devices are not easily and conveniently accessible and often require the removal of components (for example casings or other covering elements) in order to be able to access the manoeuvring assemblies or need the use of special tools such as, for example, in the case of the device of the document DE10343541.

A further disadvantage of these types of tensioning devices is linked to the fact that they do not guarantee a high degree of precision.

A further disadvantage is represented by the fact that traditional tensioning devices cannot be used in all production sectors except with appropriate modifications which can entail an increase in costs. For example, in the case of a white room or in the food sector, it would be necessary to provide the structures of the tensioners with appropriate coverings or similar means suitable for avoiding the infiltration of dust.

The object of the present invention is that of obviating the disadvantages stated above.

More particularly the object of the present invention is that of providing a tensioning device for conveyor belt with particularly reduced overall dimensions and integrated in the structure of the same belt.

A further object of the present invention is that of providing a tensioning device wherein the problem linked to the infiltration of dust is particularly reduced and/or, in any case, the removal of the same is particularly easy.

A further object of the present invention is to make available to users a tensioning device suitable for ensuring a high level of resistance and reliability in time and such, moreover, as to be easily and economically produced.

These and other objects are achieved by the device of the invention that has the features of claim 1.

According to the invention a tensioning device is provided for a conveyor belt used for moving semi-finished or finished products along the lines of production or storage or the like, comprising mechanical means integrated in the structure of a frame of said conveyor belt, provided with a rotary translation movement with manual actuation and co-operating with thrust means with translation movement for adjusting the tension of a moving mat via a change in the centre distance between a reversing roller and a motor roller which subtend said moving mat and are transversely arranged at opposite ends of two opposing and parallel lateral shoulders of the frame of said conveyor belt.

Advantageous embodiments of the invention are disclosed by the dependent claims.

The constructional and functional features of the tensioning device for conveyor belt of the present invention will be made clearer by the following detailed description, in which reference is made to the accompanying drawings which represent a preferred and non-limiting embodiment thereof and in which:

FIG. 2 shows schematically a partially blown-up front portion of the conveyor belt according to the depiction of FIG. 1;

FIG. 3 shows schematically the conveyor belt of FIG. 1 sectioned along a vertical plane parallel to the centre distance between the motor and reversing rollers;

FIG. 4 shows at schematic level an enlarged view of the detail K as per FIG. 3;

Figure 1:
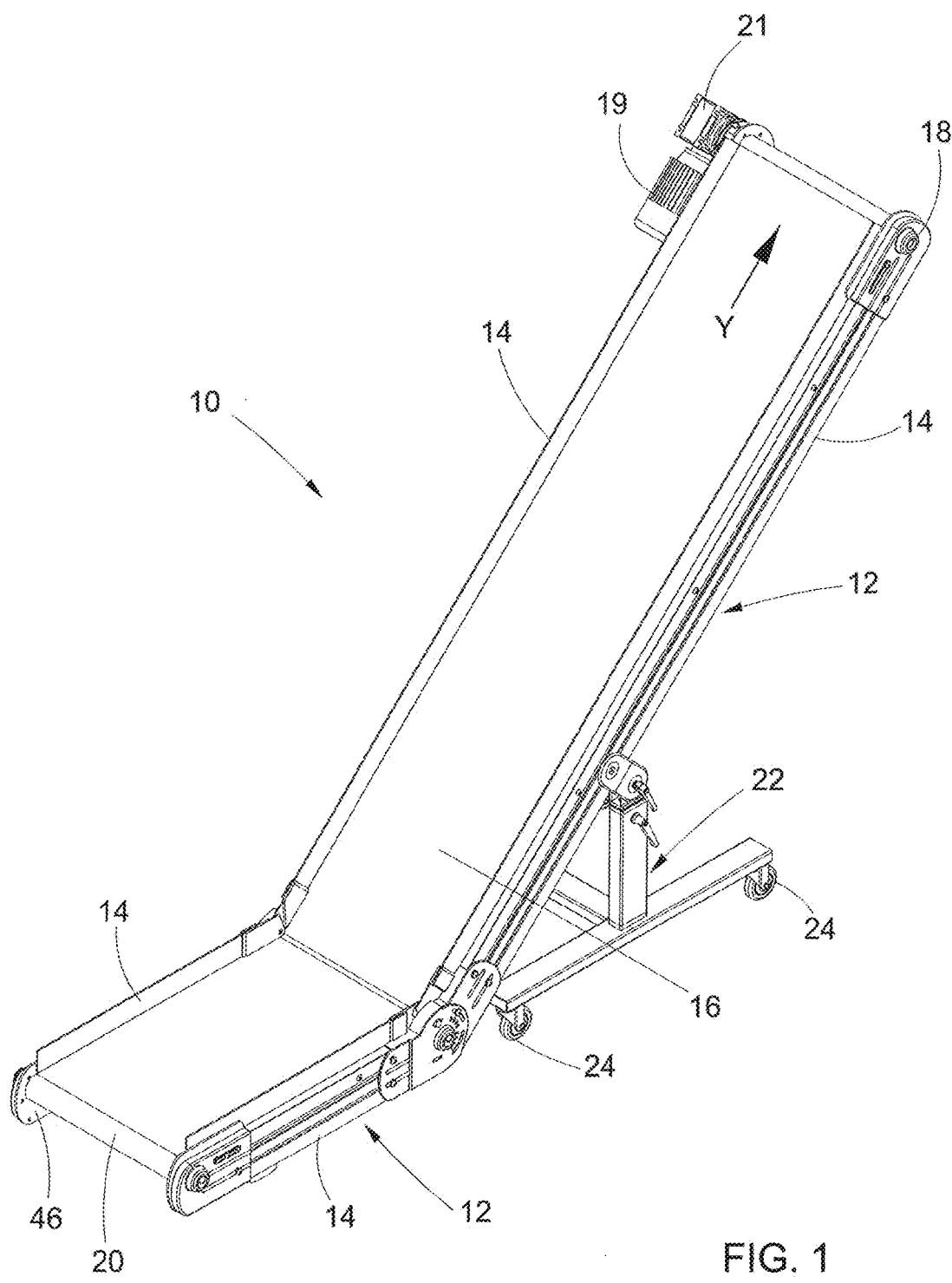
FIG. 1 shows schematically an axonometric view of a conveyor belt of the elevator type provided with the tensioning device of the invention.
Figure 5:
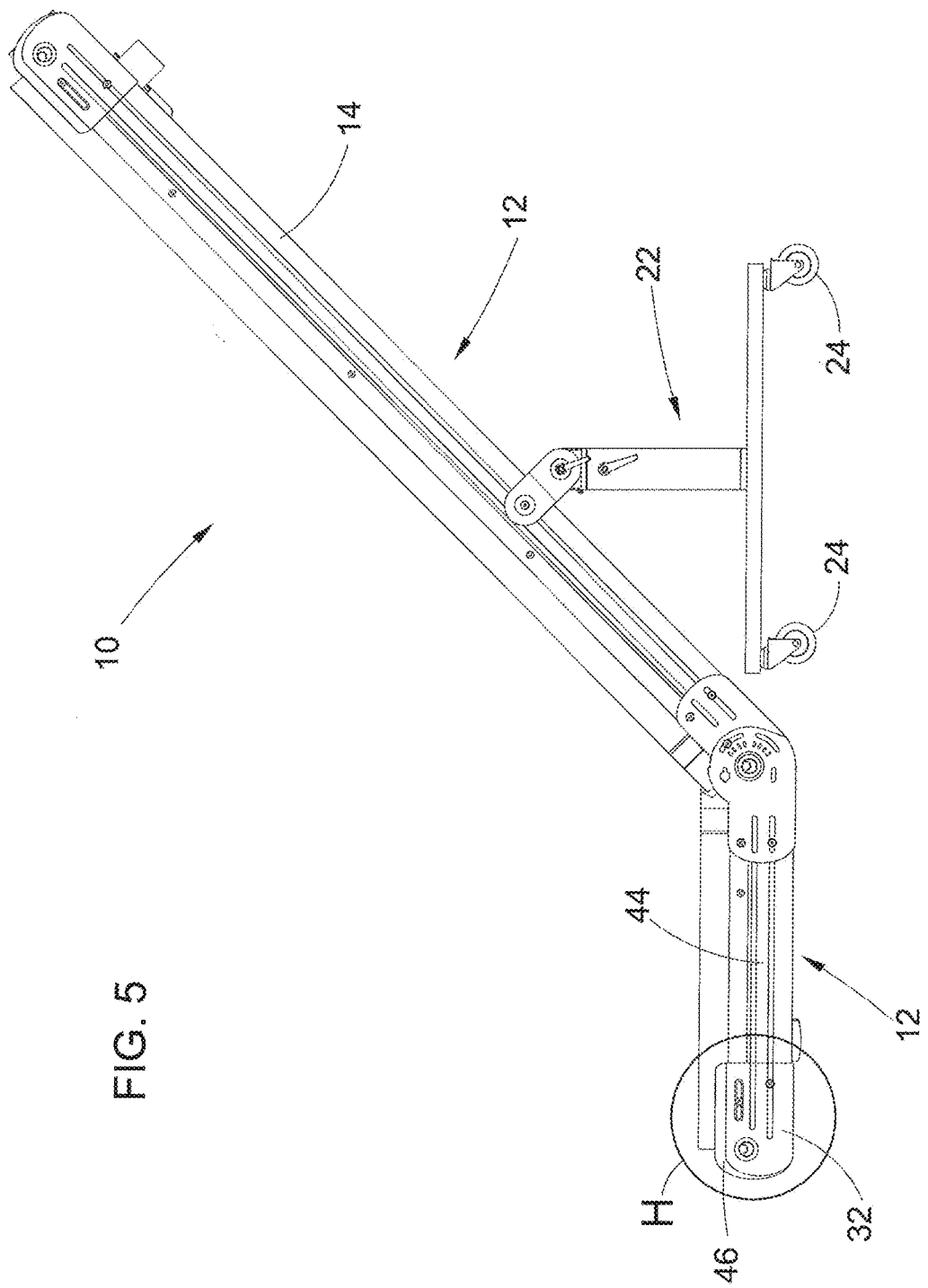
FIG. 5 shows a side view of the conveyor belt.
Figure 6:
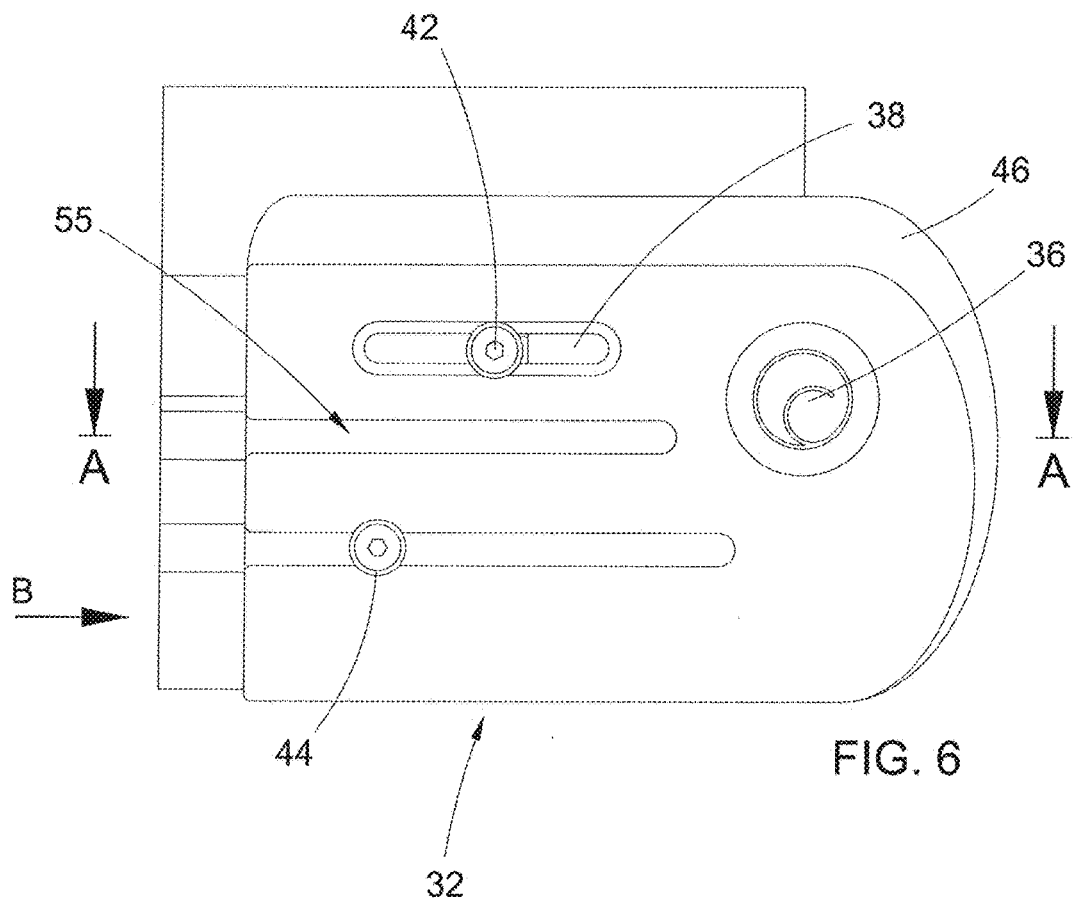
FIG. 6 shows an enlarged schematic side view of the detail H of FIG. 5.
Figure 7:
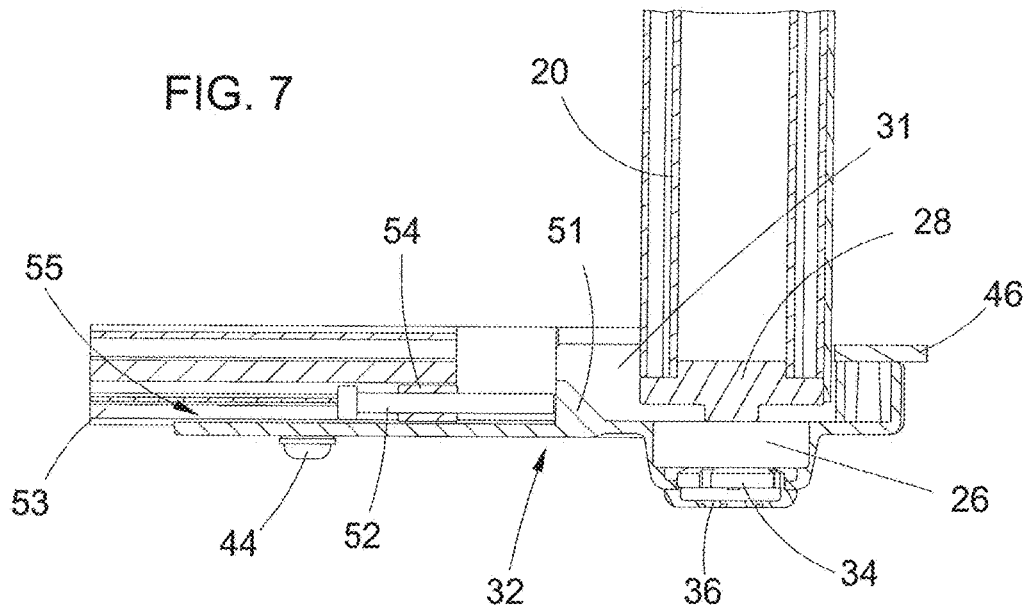
FIG. 7 shows schematically a longitudinal section view of the detail of FIG. 6 along a section plane A-A.
Figure 8:
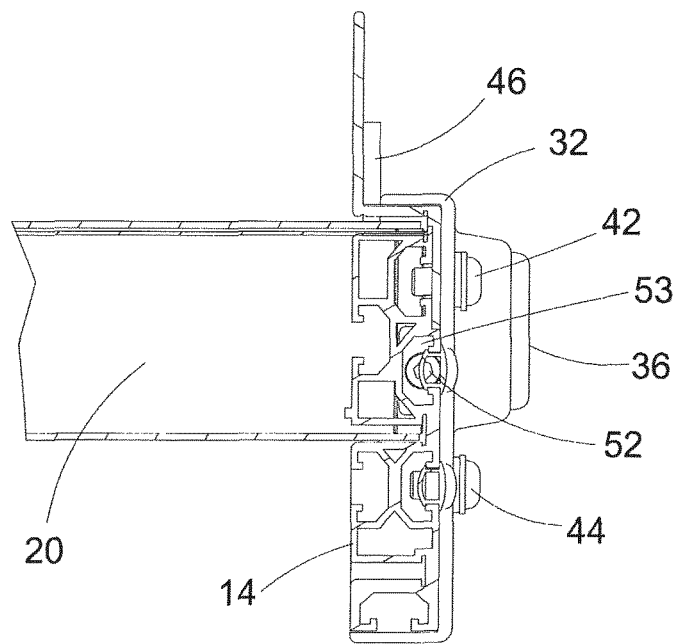
FIG. 8 shows at schematic level a side view of the detail of FIG. 6 from a point of view indicated by the arrow B in FIG. 6.

Referring to the aforementioned drawings, the tensioning device for conveyor belt of the present invention is rigidly attached to the structure of a conveyor belt 10 comprising a frame 12 defined by two opposing and parallel lateral shoulders 14 typically defined by metal section bars (in aluminium, alloys thereof or other materials suitable for the purpose and for the sector of application) and provided with transverse elements 11 (also defined by metal section bars) having the function of stiffening the structure of the frame 10, with elements of support for the sliding of a moving mat 16 (for example defined by plates or sliding surfaces 13, as schematised in FIG. 2) subtended between a motor roller 18 or head roller actuated by an electric motor 19 (optionally provided with a motor reducer 21) and a tail roller 20 or reversing roller (considering as direction of forward movement that indicated by the arrow Y in FIG. 1) with said rollers placed transversely to the opposing shoulders 14 and at their end portions.

The structure of the frame 12 is moreover secured to the ground by means of a plinth 22 with optionally adjustable height, fixed or mobile by means of wheels 24 or similar means of movement.

The tensioning device of the invention is placed at the tail portion of the conveyor belt which supports the neutral rotation of the reversing roller 20 and at the opposite ends of the same reversing roller.

More particularly the reversing roller 20, placed transversely to the opposing shoulders 14, is supported during rotation by means of opposing bearings 26 (at least one per side) fitted on a hub 28 attached to each of the opposite ends of the reversing roller 20, with said bearings inserted in dedicated seats 30 of opposing box-type bodies 32 fitted to embrace partially the opposing shoulders 14 of the frame 12 at their end portion.

The box-type bodies 32, in order to perform this function, are closed along three of the four perimeter edges to define a pocket 31 which, as defined above, accommodates or embraces part of the outer profile of the shoulders 14 and partially the ends of the reversing roller 20 provided with hubs 28 and bearings 26.

As schematised by the blown-up view of FIG. 2, the seat 30 for the bearing 26 houses, likewise, an annular element 34 with the function of spacer or stop ring and is closed, on the opposite side with respect to that of insertion of the bearing 26, by means of a cap 36.

On the outer surface of each box-type body 32 a slot 38 with longitudinal development and a hole 40 are formed, respectively apt for the insertion of a clamping screw 42 and of a further screw 44 suitable for fixing said box-type element with respect to the shoulders 14 of the frame 12 and co-operating with the means or elements described here below.

A plate 46 is arranged to partially close the box-type body 32 on the side turned in the direction of the reversing roller 20 and is attached to said box-type body by means of screws 50 or of other known and equivalent retaining means. Said plate is tendentially shaped like a "J" to define a further pocket 48 apt to embrace an end portion of the reversing roller 20 as schematised in FIG. 2.

The inner face of each box-type body 32, turned in the direction of the reversing roller 20, is provided with a projecting appendage 51 developed away from said inner face and suitable for engaging or for coming into contact, according to what is detailed here below, with at least one threaded screw 52 longitudinally inserted in a compartment 53 with longitudinal development of the opposing shoulders 14 of the frame 12 at their end portion closed by said box-type bodies 32 and roto-translatably coupled with a coaxial threaded insert 54 likewise inserted and securely restrained in said longitudinal compartments 53.

The assembly defined by the coupling between the single box-type body 32 and the section bar defining the single shoulder 14, on the opposite side with respect to that of coupling with the reversing roller 20, defines an opening 55 accessible by a tool for manoeuvring defined, for example, by an Allen key or another type and suitable for rotating the screw 52 with respect to the coaxial threaded insert 54, so as to define a coupling of the screw-lead screw type.

The functioning of the tensioning device of the present invention, described in detail above with reference to its constructional features, is detailed here below.

In the case wherein it is necessary to restore or vary/regulate the tension of the mobile mat 16, an operator loosens the screw 42 and the further screw 44 of each box-type body 32 and, inserting an appropriate tool through the opening 55, goes to act on the screw 52 inserted in the longitudinal compartment 53 of the shoulder 14 and imposes the roto-translation thereof with respect to the threaded insert 54. In this way, by acting in the direction of screwing, the threaded screw 52 moves forwards, roto-translating with respect to the threaded insert 54 and, by pressing against the appendage 51 of the box-type element 32, causes a displacement of the box-type body 32 and, consequently, of the reversing roller 20 restrained thereto in a direction parallel to the axis of the same with a correlated variation of its centre distance with respect to the motor roller 18.

As can be seen from the above the advantages that the device of the invention achieves are clear.

The tensioning device for conveyor belt of the invention allows advantageously tensioning of the mobile mat of the conveyor belt rapidly and easily.

Further advantageous is the fact that the tensioning device of the invention is completely integrated in the structure of the conveyor belt, hidden from sight yet, at the same time, easily accessible by the operator.

A further advantage is represented by the fact that the device of the invention is simple to make, small in size and not bulky.

The device of the invention, moreover, taking account of the fact that it is completely integrated in the structure of the frame of the conveyor belt, is less subject to infiltration of dust and, consequently, can be advantageously used also for conveyor belts operating in a white room or in the food industry.

Although the invention has been described above with particular reference to one of its embodiments given solely by way of a non-limiting example, numerous changes and variations will appear clear to a person skilled in the art in light of the description given above. The present invention intends, therefore, to embrace all the modifications and the variations that fall within the scope of the following claims.

The invention claimed is:

1. A conveyor belt (10) for moving products, the conveyor belt comprising:
   a frame (12) defined by two opposing and parallel shoulders (14) formed by metal section bars with longitudinal compartments therein and provided with transverse stiffening elements (11) and elements of support for sliding of a moving mat (16) subtended between a motor roller (18) and a reversing roller (20) transversally placed at end portions of the opposing shoulders (14); and
   a tensioning device comprising at least one threaded screw (52) longitudinally inserted in a respective one of the longitudinal compartments (53) of the opposing shoulders (14) of the frame (12) and roto-translatably coupled with at least one coaxial threaded insert (54) inserted in said respective one of the longitudinal compartments and securely restrained in said longitudinal compartment (53), said threaded screw (52) and coaxial threaded insert (54) co-operating with a projecting appendage (51) depending from an inner face of opposing bodies (32), closed along three of four perimeter edges to define a pocket (31), partially covering an outer side portion of each of the opposing shoulders (14) of the frame (12) and defining with an outer lateral section bar of each of said opposing shoulders (14), on the side opposite to the one supporting said reversing roller (20), an opening (55) accessible by a tool suitable for engaging with the at least one threaded screw (52) for adjusting tension of the moving mat (16) via a change in a center distance between the reversing roller (20) and the motor roller (18), said tensioning device being integrated in the opposing shoulders of the frame.

2. The conveyor belt according to claim 1, wherein each of the opposing bodies (32) comprises a seat (30) formed on the inner face of said body and suitable for housing at least one bearing (26) fitted on a hub (28) fixed to each of the opposing ends of the reversing roller (20).

3. The conveyor belt according to claim 1, wherein each of the opposing bodies (32) comprises a through slot (38) longitudinally extending and a through hole (40), formed on the outer surface of each said opposing body (32) and respectively for insertion of a clamping screw (42) and of a further clamping screw (44) suitable for fixing said opposing body with respect to the shoulders (14) of the frame (12).

4. Method for adjusting the tension of a moving mat (16) of a conveyor belt (10) by means of a tensioning device according to claim 3, which comprises the following steps for a displacement of the reversing roller (20) parallel to its axis:
   loosening of the clamping screw (42) and of the further screw (44) of each said opposing body (32) fixed to each of the opposing shoulders (14) of the frame (12);
   insertion of a tool in the opening (55) to engage with the threaded screw (52);
   rotation of the threaded screw (52) to exert, with a roto-translation advancing movement, a thrust action on the protruding appendage (51) of the opposing body (32) rotatably supporting the reversing roller (20); and
   tightening of the clamping screw (42) and of the further screw (44) of each said opposing body (32).

5. The conveyor belt according to claim 1, further comprising a plate (46) arranged to partially close the pocket (31) of the opposing body (32) on a side turned in a direction of the reversing roller (20), shaped like a "J" to define a further pocket (48) to embrace an end portion of the reversing roller (20).

6. The conveyor belt according to claim 2, wherein each of the opposing bodies (32) comprises a through slot (38) longitudinally extending and a through hole (40), formed on the outer surface of each said opposing body (32) and respectively for insertion of a clamping screw (42) and of a further clamping screw (44) suitable for fixing said opposing body with respect to the shoulders (14) of the frame (12).

7. A conveyor belt (10) for moving products, the conveyor belt comprising:
   a frame (12) defined by two opposing and parallel shoulders (14) provided with transverse stiffening elements (11) and elements of support for the sliding of a moving mat (16) subtended between a motor roller (18) and a reversing roller (20) transversally placed at end portions of the opposing shoulders (14);
   a tensioning device comprising at least one threaded screw (52) longitudinally inserted in a longitudinal compartment (53) of the opposing shoulders (14) of the frame (12) at their end portions and roto-translatably coupled with at least one coaxial threaded insert (54) inserted and securely restrained in said longitudinal compartment (53), said threaded screw (52) and coaxial threaded insert (54) co-operating with a projecting appendage (51) depending from an inner face of opposing bodies (32), closed along three of four perimeter edges to define a pocket (31), partially covering an outer side portion of each of the opposing shoulders (14) of the frame (12) and defining with an outer lateral section bar of each of said opposing shoulders (14), on the side opposite to the one supporting said reversing roller (20), an opening (55) accessible by a tool suitable for engaging with the at least one threaded screw (52) for adjusting tension of the moving mat (16) via a change in a center distance between the reversing roller (20) and the motor roller (18); and
   a plate (46) arranged to partially close the pocket (31) of the opposing body (32) on a side turned in a direction of the reversing roller (20), shaped like a "J" to define a further pocket (48) to embrace an end portion of the reversing roller (20).

8. The conveyor belt according to claim 7, wherein each of the opposing bodies (32) comprises a through slot (38) longitudinally extending and a through hole (40), formed on the outer surface of each said opposing body (32) and respectively for insertion of a clamping screw (42) and of a further clamping screw (44) suitable for fixing said opposing body with respect to the shoulders (14) of the frame (12).

* * * * *